(12) United States Patent
Gao et al.

(10) Patent No.: US 11,138,046 B2
(45) Date of Patent: Oct. 5, 2021

(54) METHODS FOR AUXILIARY SERVICE SCHEDULING FOR GRID COMPUTING AND DEVICES THEREOF

(71) Applicant: JPMorgan Chase Bank, N.A., New York, NY (US)

(72) Inventors: Minlin Gao, Livingston, NJ (US); Darren Marvin, Poole (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 198 days.

(21) Appl. No.: 16/444,362

(22) Filed: Jun. 18, 2019

(65) Prior Publication Data
US 2019/0384643 A1  Dec. 19, 2019

Related U.S. Application Data

(60) Provisional application No. 62/686,742, filed on Jun. 19, 2018.

(51) Int. Cl.
| | |
|---|---|
| *G06F 9/46* | (2006.01) |
| *G06F 9/50* | (2006.01) |
| *G06F 9/48* | (2006.01) |
| *G06F 9/54* | (2006.01) |
| *G06F 9/38* | (2018.01) |

(52) U.S. Cl.
CPC .......... *G06F 9/5072* (2013.01); *G06F 9/3838* (2013.01); *G06F 9/4881* (2013.01); *G06F 9/5022* (2013.01); *G06F 9/542* (2013.01)

(58) Field of Classification Search
CPC ...... G06F 9/5072; G06F 9/4881; G06F 9/542; G06F 9/5022; G06F 9/3838; G06F 2209/503; G06F 9/5027
See application file for complete search history.

(56) References Cited

U.S. PATENT DOCUMENTS

| | | | |
|---|---|---|---|
| 8,775,438 B1* | 7/2014 | Brooker | G06F 9/5077 707/748 |
| 9,531,580 B1* | 12/2016 | Seaman | H04L 29/08072 |
| 9,886,311 B2* | 2/2018 | Miller | G06F 9/4843 |
| 9,929,969 B1* | 3/2018 | Krottapalli | H04L 29/06 |
| 10,365,985 B2* | 7/2019 | Wagner | G06F 11/3003 |
| 2006/0136684 A1* | 6/2006 | Le | G06F 3/065 711/154 |
| 2006/0253621 A1* | 11/2006 | Brewer | G06F 3/0659 710/40 |
| 2007/0203959 A1* | 8/2007 | Cho | G06F 9/5022 |
| 2009/0077235 A1* | 3/2009 | Podila | G06F 9/5044 709/226 |

(Continued)

*Primary Examiner* — Adam Lee
(74) *Attorney, Agent, or Firm* — Greenblum & Bernstein, P.L.C.

(57) ABSTRACT

Systems and methods for managing resources in a multi-tenancy grid computing environment are provided. The methods include an auxiliary service scheduler managing the lifecycle of auxiliary services by policies to optimize the resource allocation; coordinating with an application scheduler to dispatch tasks and an auxiliary service to the same set of servers; and using a multiple layer auxiliary service map to manage and record auxiliary service status. The methods optimize dynamical resource sharing between applications with a dependency on an auxiliary service running aside on the same server.

18 Claims, 6 Drawing Sheets

(56) References Cited

U.S. PATENT DOCUMENTS

| | | | |
|---|---|---|---|
| 2009/0276519 A1* | 11/2009 | Alimi | G06F 9/5072 709/224 |
| 2010/0186010 A1* | 7/2010 | Chalemin | G06F 9/45533 718/1 |
| 2010/0299499 A1* | 11/2010 | Golla | G06F 9/3824 712/206 |
| 2010/0306354 A1* | 12/2010 | DeHaan | H04L 41/0806 709/222 |
| 2010/0318827 A1* | 12/2010 | Shah | G06F 1/3203 713/324 |
| 2012/0222037 A1* | 8/2012 | Labat | G06F 9/5072 718/104 |
| 2013/0219386 A1* | 8/2013 | Geibel | G06F 9/45558 718/1 |
| 2014/0059209 A1* | 2/2014 | Alnoor | G06F 11/1438 709/224 |
| 2017/0171855 A1* | 6/2017 | Sundararajan | H04W 74/08 |

* cited by examiner

METHODS FOR AUXILIARY SERVICE SCHEDULING FOR GRID COMPUTING AND DEVICES THEREOF

CROSS-REFERENCE TO RELATED APPLICATIONS

This application claims the benefit of U.S. Provisional Patent Application Ser. No. 62/686,742, filed Jun. 19, 2018, which is hereby incorporated by reference in its entirety.

BACKGROUND

1. Field of the Disclosure

This technology generally relates to methods and systems for managing computing resources, and more particularly, to methods and systems for scheduling and managing auxiliary services for applications in a multi-tenancy grid computing environment.

2. Background Information

The following abbreviations are used herein:

Application: The application referred to here is a grid application which consists of many small computation units which can be distributed to many (i.e., one or more) compute servers.

Task: a computation unit of an application which can be dispatched to a compute server and run.

Auxiliary Service: a process running on a compute server which provides a specific service to application. A data cache service can be an auxiliary service to data analytics application.

Server: a compute server which can run tasks and services.

Resource pool: a logical pool containing servers.

Scheduler: a process which dispatches tasks to servers and manage the lifecycle of tasks.

Many applications running in a compute grid have dependencies on an auxiliary service. Before the application starts to run on a particular server, the auxiliary service needs to be started first. For a static, silo compute grid, as all the servers are static, the auxiliary service(s) can be pre-started and available on all servers such that the application can run on any of these servers.

In a multi-tenancy compute grid, compute resources can be dynamically shared among different applications. A server can run tasks from different applications at different times. Therefore, it may not be possible to pre-start auxiliary services on all servers in such a multi-tenancy grid. As a result, there is a need for a way to manage the life cycle of the auxiliary service dynamically according to the application needs.

Therefore, in view of the above, there is a need for a scheduling system and method for managing and scheduling auxiliary services for applications that operate in a grid computing environment, in order to dynamically share resources in an efficient and non-disruptive manner.

SUMMARY

The present disclosure, through one or more of its various aspects, embodiments, and/or specific features or sub-components, provides, inter alia, various systems, servers, devices, methods, media, programs, and platforms for managing resources in a multi-tenancy grid computing environment. The various aspects, embodiments, features, and/or sub-components provide optimized processes of scheduling and managing auxiliary services for applications in a multi-tenancy grid computing environment.

The auxiliary service scheduler works closely with the application scheduler to dynamically schedule auxiliary services.

When the application scheduler receives a request from an application client to run tasks of the application which require an auxiliary service, it will check with the auxiliary service scheduler for a preferred server list for task dispatch. The auxiliary service scheduler will send back the list of servers with the required auxiliary service running or nothing if the auxiliary service has not started anywhere.

The application scheduler makes a decision as to which servers the tasks will be dispatched in, taking into consideration of the preferred server list from auxiliary service. The application scheduler generates a server list.

The application scheduler then sends a request to the auxiliary service scheduler with the server list. The auxiliary service scheduler will check the status of the required auxiliary service on each server and start the auxiliary service if it is not running yet.

The application scheduler then dispatches the tasks to these servers.

When a task completes, the application scheduler will send a notification to the auxiliary service scheduler that the auxiliary service is not required any more. The auxiliary service scheduler will then take action on the auxiliary service and prepare for the next request.

The auxiliary service scheduler uses a multiple layer auxiliary service map to record the lifecyle of auxiliary services. Each layer represents one auxiliary service.

An auxiliary service status on every server is recorded in the map. Typical statuses may include "R:Running" and "D:Down". More statuses may be introduced for fine-grain lifecycle control of auxiliary service.

The auxiliary service scheduler manages the lifecycle of the auxiliary services:

1) Activate auxiliary service and get it ready for tasks, including start up auxiliary service, setup and configuration of auxiliary service.

2) Deactivate auxiliary service after tasks complete. A few policies can be applied on how to deactivate auxiliary service:
   a. Immediately shutdown auxiliary service
   b. Keep auxiliary service in memory until a task requiring another auxiliary service is dispatched to the same server.
   c. Keep auxiliary service in memory for a period of time
   d. Always keep auxiliary in memory The auxiliary service scheduler is also responsible to generate resource preferences for the application scheduler with the following policies:
   a. Servers with an auxiliary service running will be preferred for tasks requiring the auxiliary service, and will be least preferred for tasks requiring a different auxiliary service.
   b. Servers with no auxiliary service running will be preferred for tasks without dependency on an auxiliary service.

According to an aspect of the present disclosure, a method for managing tasks in a multi-platform environment text is provided. The method is implemented by a processor on a computing device. The method includes: receiving, from a first client device, a first request for access to a specific auxiliary service in support of a set of tasks; using an auxiliary service map to determine at least one server device that is available for providing the access to the auxiliary service; allocating, to the first client device, at least one of the available at least one server device; updating the auxiliary service map based on a result of the allocating; receiving, from the tasks, a notification that the tasks are complete; deallocating each of the allocated at least one server device; and updating the auxiliary service map based on a result of the deallocating.

The method may further include initializing the auxiliary service on the allocated at least one server device prior to the updating the auxiliary service map based on the result of the allocating.

The method may further include: receiving, from a second client device and prior to the deallocating, a second request for access to the same or different auxiliary service in support of a set of tasks; using, prior to the deallocating, the auxiliary service map that has been updated based on a result of the allocating to determine at least one server device that is available for providing the access to the second auxiliary service; allocating, to the second client device, at least one of the available at least one server device; and updating the auxiliary service map based on a result of the allocating to the second client device.

The auxiliary service map may include a plurality of layers. A number of layers may correspond to a number of auxiliary services. Each respective layer from among the plurality of layers may include a plurality of server devices from which an availability determination is to be made.

The method may further include: when at least one additional request is received for access to at least one additional auxiliary service in support of at least one additional task, dynamically sharing the plurality of server devices by using the auxiliary service map to determine, for each of the plurality of server devices, a respective time slot of availability for providing access to the at least one additional auxiliary service.

The availability determination may be made by determining, for each of the plurality of server devices, at least one of an amount of available memory and an amount of available central processing unit (CPU) capacity.

The tasks may relate to a data analytics application or a high performance computing (HPC) application.

The using the auxiliary service map to determine at least one server device that is available for providing the access to the first auxiliary service may include using the auxiliary service map to determine a recommended set of available server devices. The allocating may include allocating at least one of the recommended set of available server devices to the first client device.

The method may further include: when the notification that the first task is complete is received, delaying a deallocation of each of the allocated at least one server device until a second request for an access to a second auxiliary service is received; receiving, from a second client device, the second request for the access to the second auxiliary service in support of a second task; and performing the deallocating in response to the receiving the second request.

According to another aspect of the present disclosure, a computing device configured to implement an execution of a method for managing resources in a grid computing environment is provided. The computing device includes a processor, a memory, and a communication interface coupled to each of the processor and the memory. The processor is configured to: receive, from a first client device, a first request for an access to a first auxiliary service in support of a first task; use an auxiliary service map to determine at least one server device that is available for providing the access to the first auxiliary service; allocate, to the first client device, at least one of the available at least one server device; update the auxiliary service map based on a result of the allocating; receive, from the first client device, a notification that the first task is complete; deallocate each of the allocated at least one server device; and updating the auxiliary service map based on a result of the deallocating.

The processor may be further configured to initialize the first auxiliary service on the allocated at least one server device prior to the updating the auxiliary service map based on the result of the allocating.

The processor may be further configured to: receive, from a second client device and prior to the deallocating, a second request for an access to a second auxiliary service in support of a second task; use, prior to the deallocating, the auxiliary service map that has been updated based on a result of the allocating to determine at least one server device that is available for providing the access to the second auxiliary service; allocate, to the second client device, at least one of the available at least one server device; and update the auxiliary service map based on a result of the allocating to the second client device.

The auxiliary service map may include a plurality of layers. A number of layers may correspond to a number of auxiliary services. Each respective layer from among the plurality of layers may include a plurality of server devices from which an availability determination is to be made.

The processor may be further configured to: when at least one additional request is received for access to at least one additional auxiliary service in support of at least one additional task, dynamically share the plurality of server devices by using the auxiliary service map to determine, for each of the plurality of server devices, a respective time slot of availability for providing access to the at least one additional auxiliary service.

The availability determination may be made by determining, for each of the plurality of server devices, at least one of an amount of available memory and an amount of available central processing unit (CPU) capacity.

The first task may relate to a data analytics application or an HPC application.

The processor may be further configured to use the auxiliary service map to determine a recommended set of available server devices, and to allocate at least one of the recommended set of available server devices to the first client device.

The processor may be further configured to: when the notification that the first task is complete is received, delay a deallocation of each of the allocated at least one server device until a second request for an access to a second auxiliary service is received; receive, from a second client device, the second request for the access to the second auxiliary service in support of a second task; and perform the deallocation in response to the receiving the second request.

According to another aspect of the present disclosure, a non-transitory computer-readable medium is provided. The non-transitory computer-readable medium stores instructions which, when executed by a processor, cause the processor to execute a method for managing resources in a grid computing environment. The method includes: receiving, from a first client device, a first request for an access to a first auxiliary service in support of a first task; using an auxiliary service map to determine at least one server device that is available for providing the access to the first auxiliary service; allocating, to the first client device, at least one of the available at least one server device; updating the auxiliary service map based on a result of the allocating; receiving, from the first client device, a notification that the first task is complete; deallocating each of the allocated at least one server device; and updating the auxiliary service map based on a result of the deallocating.

The method may further include initializing the first auxiliary service on the allocated at least one server device prior to the updating the auxiliary service map based on the result of the allocating.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
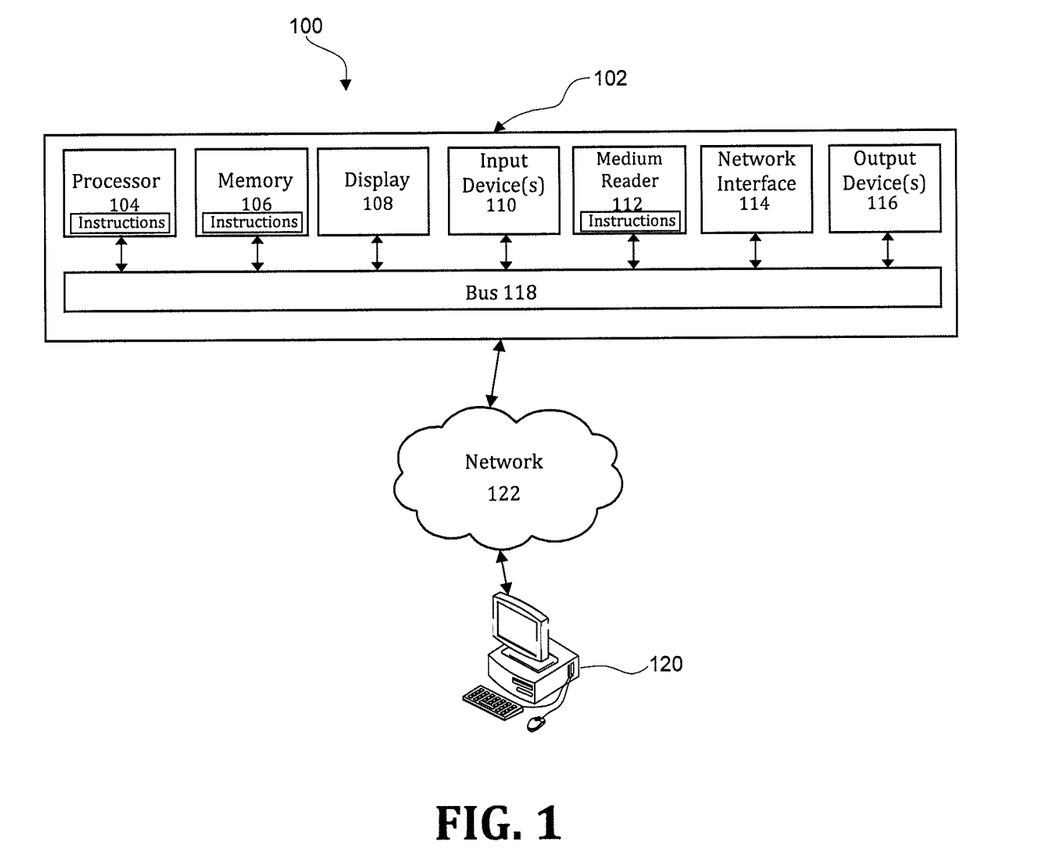
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of scheduling and managing auxiliary services for applications in a multi-tenancy grid computing environment.

Figure 2:
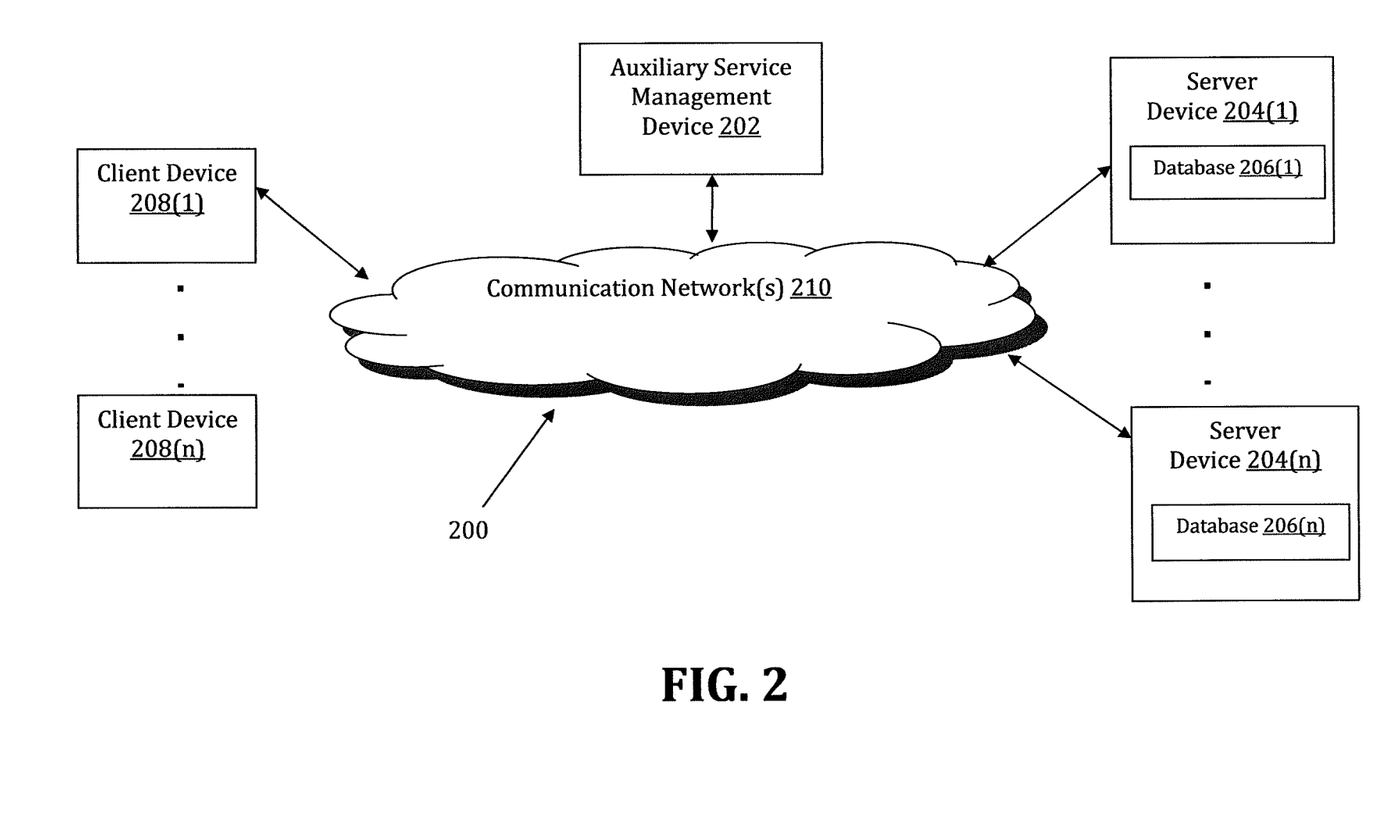
FIG. 2 illustrates an exemplary diagram of a network environment.

Referring to FIG. 2, a schematic of an exemplary network environment 200 for implementing a method for scheduling and managing auxiliary services for applications in a multi-tenancy grid computing environment is illustrated. In an exemplary embodiment, the method is executable on any networked computer platform, such as, for example, a wireless mobile communication device, i.e., a smart phone.

The method for scheduling and managing auxiliary services for applications in a multi-tenancy grid computing environment may be implemented by an Auxiliary Service Management (ASM) device 202. The ASM device 202 may be the same or similar to the computer system 102 as described with respect to FIG. 1. The ASM device 202 may store one or more applications that can include executable instructions that, when executed by the ASM device 202, cause the ASM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASM device 202 itself, may be located in virtual server(s) running in a cloud-based computing environment rather than being tied to one or more specific physical network computing devices. Also, the application(s) may be running in one or more virtual machines (VMs) executing on the ASM device 202. Additionally, in one or more embodiments of this technology, virtual machine(s) running on the ASM device 202 may be managed or supervised by a hypervisor.

In the network environment 200 of FIG. 2, the ASM device 202 is coupled to a plurality of server devices 204(1)-204(n) that hosts a plurality of databases 206(1)-206(n), and also to a plurality of client devices 208(1)-208(n) via communication network(s) 210. A communication interface of the ASM device 202, such as the network interface 114 of the computer system 102 of FIG. 1, operatively couples and communicates between the ASM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ASM devices that efficiently schedule and manage large numbers of auxiliary services for data analytics applications in a grid computing environment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASM device 202 may be a standalone device or integrated with one or more other devices or apparatuses, such as one or more of the server devices 204(1)-204(n), for example. In one particular example, the ASM device 202 may include or be hosted by one of the server devices 204(1)-204(n), and other arrangements are also possible. Moreover, one or more of the devices of the ASM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ASM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store auxiliary service map data, data analytics application data, and any other data that relates to resource management and administration.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the execution of a data analytics application. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ASM device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ASM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ASM device 202, the server devices 204(1)-204(n), or the client devices 208(1)-208(n), for example, may be configured to operate as virtual instances on the same physical machine. In other words, one or more of the ASM device 202, the server devices 204(1)-204(n), or the client devices 208(1)-208(n) may operate on the same physical device rather than as separate devices communicating through communication network(s) 210. Additionally, there may be more or fewer ASM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
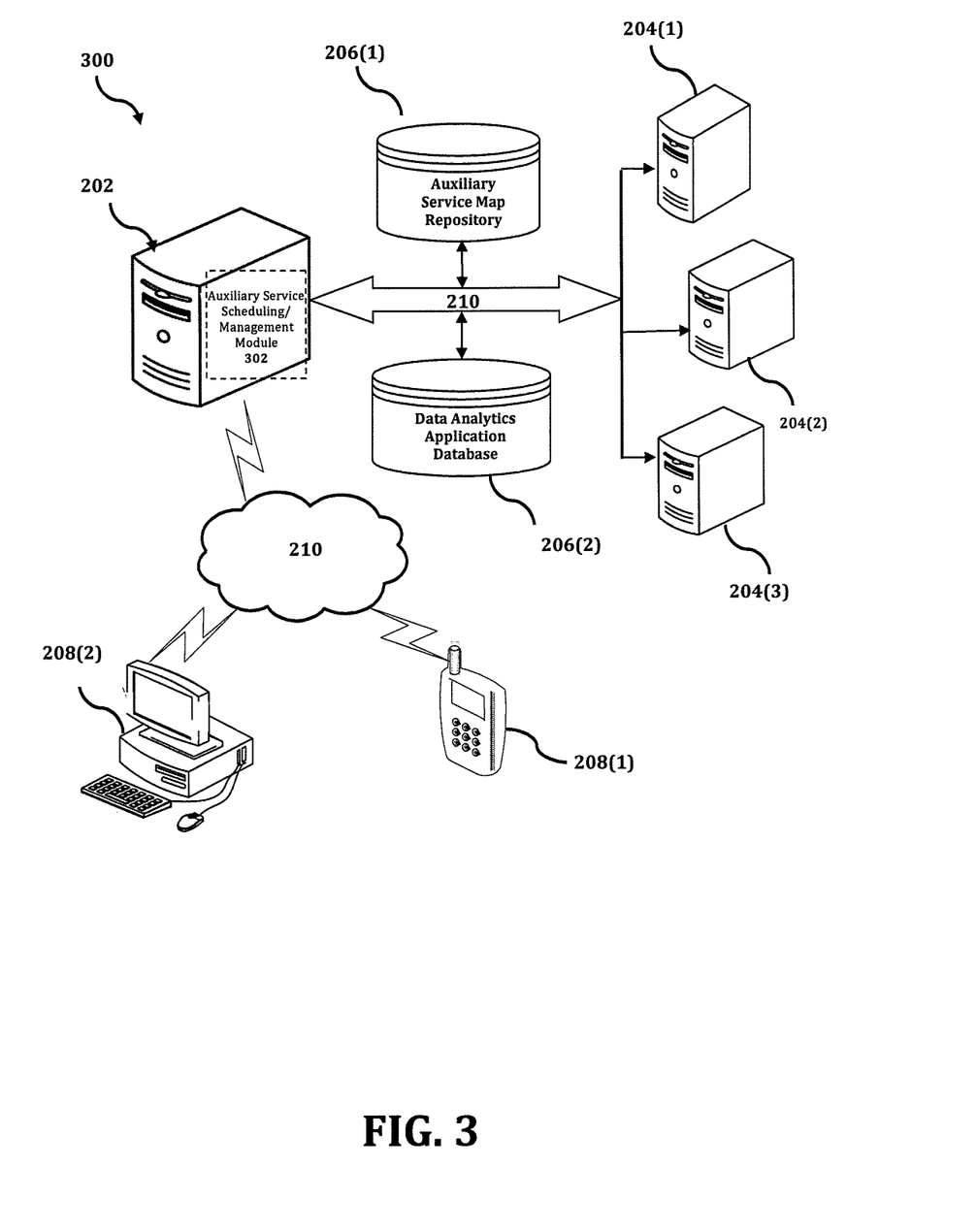
FIG. 3 shows an exemplary system for managing resources in a grid computing environment.

The ASM device 202 is described and shown in FIG. 3 as including an auxiliary service scheduling/management module 302, although it may include other modules, databases, or applications, for example. As will be described below, the auxiliary service scheduling/management module 302 is configured to process large numbers of auxiliary service requests in order to schedule and manage resources in a grid computing environment in an automated, efficient, scalable, and reliable manner.

An exemplary process 300 for scheduling and managing auxiliary services for data analytics applications in a grid computing environment by utilizing the network environment of FIG. 2 is shown as being executed in FIG. 3. Specifically, a first client device 208(1), a second client device 208(2), a first server device 204(1), a second server device 204(2), and a third server device 204(3) are illustrated as being in communication with ASM device 202. In this regard, the first client device 208(1) and the second client device 208(2) may be "clients" of the ASM device 202 and are described herein as such. Nevertheless, it is to be known and understood that the first client device 208(1) and/or the second client device 208(2) need not necessarily be "clients" of the ASM device 202, or any entity described in association therewith herein. Any additional or alternative relationship may exist between either or both of the first client device 208(1) and the second client device 208(2) and the ASM device 202, or no relationship may exist.

The first server device 204(1), the second server device 204(2), and the third server device 204(3) may represent host servers that are included in a resource pool, and as such, are generally available to provide auxiliary services. Further, ASM device 202 is illustrated as being able to access an auxiliary service map repository 206(1) and a data analytics application database 206(2). The auxiliary service scheduling/management module 302 may be configured to access these databases for implementing a process for scheduling and managing auxiliary services for data analytics applications in a grid computing environment.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ASM device 202 via broadband or cellular communication. Of course, these embodiments are merely exemplary and are not limiting or exhaustive.

Upon being started, the auxiliary service scheduling/management module 302 executes a process for managing resources in a grid computing environment. An exemplary process for scheduling and managing auxiliary services for data analytics applications in a grid computing environment is generally indicated at flowchart 400 in FIG. 4.

Figure 4:
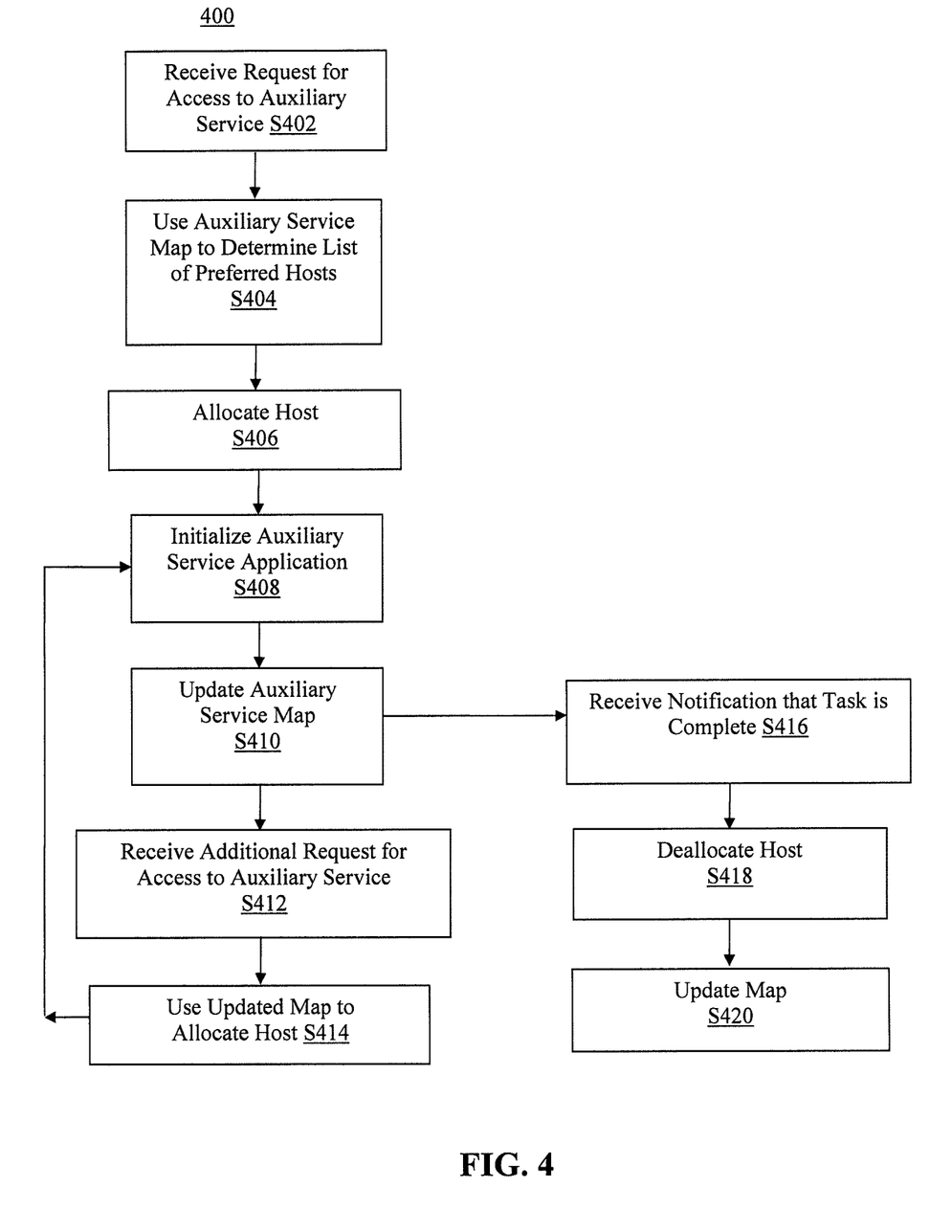
FIG. 4 is a flowchart of an exemplary method for scheduling and managing auxiliary services for applications in a multi-tenancy grid computing environment.

In the process 400 of FIG. 4, at step S402, the auxiliary service scheduling/management module 302 receives a request from a first client device 208 for access to an auxiliary service that is needed in support of a first task. In an exemplary embodiment, the auxiliary service may include a data access service. However, other types of services may be requested.

At step S404, the auxiliary service scheduling/management module 302 uses an auxiliary service map to determine a list of server devices that are available to provide access to the requested auxiliary service. The availability determination may be made by determining a respective amount of available memory and/or a respective amount of available central processing unit (CPU) capacity with respect to a particular server device. In an exemplary embodiment, a list of preferred server devices, also referred to herein as "hosts", is obtained. A resource allocation operation is performed based on the list of preferred hosts, and then, at step S406, a host server device is allocated to the client device 208 from which the request was received in step S402.

At step S408, the auxiliary service scheduling/management module 302 initializes the requested auxiliary service by transmitting an initialization request to the allocated host server device. Then, at step S410, the auxiliary service scheduling/management module 302 updates the auxiliary service map, in order to ensure that subsequent allocations are made based on the current allocation and the resultant change in its availability.

The client device 208 is then able to execute an application in conjunction with the auxiliary service. In an exemplary embodiment, the application is a data analytics application. However, other types of applications that require auxiliary services for support may also be executed.

At step S412, a new request for access to an auxiliary service is received. Then, at step S414, the auxiliary service scheduling/management module uses the updated auxiliary service map to obtain a list of available hosts and to allocate a host in response to the newly received request. The process then returns to step S408 to initialize the new auxiliary service. In this manner, the auxiliary service scheduling/management module dynamically allocates resources based on the auxiliary service map, which is constantly being updated.

When the execution of an application (e.g., a data analytics application) is complete, then at step S416, the auxiliary service scheduling/management module 302 receives a notification that the task is complete. Then, at step S418, a deallocation request is transmitted to the corresponding host server device, in order to make the resource available for later allocations. The auxiliary service map is then updated at step S420 in order to reflect the availability of the resource.

Figure 5:
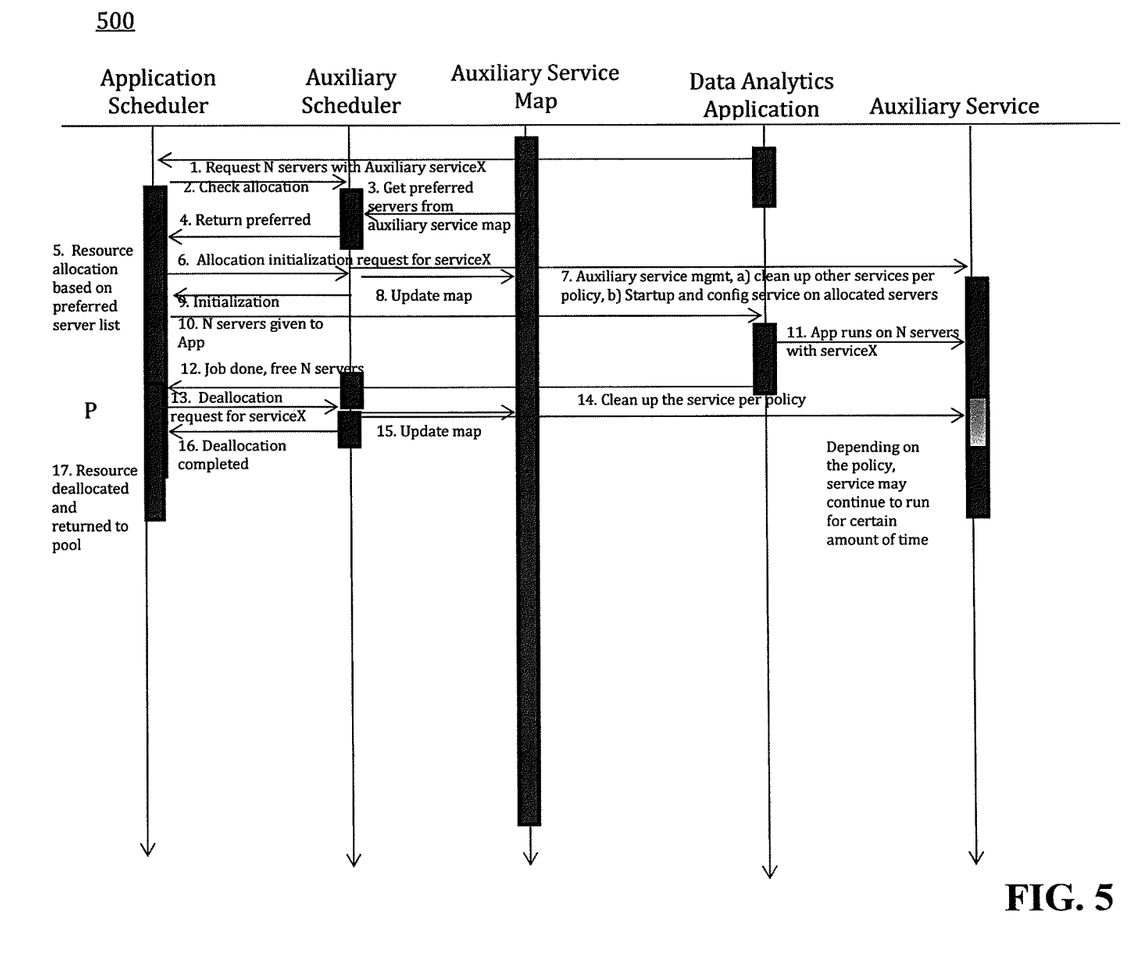
FIG. 5 is a data flow diagram that illustrates a sequence of coordinated actions that are performed in a process for scheduling and managing auxiliary services in a grid computing environment, according to an exemplary embodiment.

FIG. 5 is a data flow diagram that illustrates a sequence of coordinated actions that are performed in a process 500 for scheduling and managing auxiliary services in a grid computing environment, according to an exemplary embodiment. In the data flow diagram of FIG. 5, the process 500 begins when in a first operation, a client device on which a data analytics application is to be executed submits a request to a main scheduler for N host server devices to provide auxiliary service X. In a second operation, the main scheduler transmits a "check allocation" request that serves as a request for access to auxiliary service X.

In a third operation, an auxiliary scheduler (e.g., the ASM device 202) uses an auxiliary service map to obtain a list of preferred hosts that are available for providing auxiliary service X, and in a fourth operation, the auxiliary scheduler transmits the list of preferred hosts to the main scheduler. In a fifth operation, a resource allocation is performed in order to allocate N hosts for providing auxiliary service X.

In a sixth operation, an initialization request for auxiliary service X is transmitted to the N hosts that have been allocated. In a seventh operation, each of the N hosts performs a clean up operation that includes ending previously running auxiliary services and an initialization and configuration for running auxiliary service X.

In an eighth operation, the auxiliary scheduler updates the auxiliary service map based on the allocation of the N hosts to provide auxiliary service X. In a ninth operation, the auxiliary scheduler transmits a notification to the main scheduler that the initialization of auxiliary service X is complete.

In a tenth operation, the main scheduler notifies the client device that the N hosts are ready to provide auxiliary service X in support of the data analytics application. In an eleventh operation, the data analytics application is executed in conjunction with the auxiliary service X being run on the N hosts.

In a twelfth operation, when the execution of the data analytics application is completed, a notification is transmitted to main scheduler that the job is done and that the N hosts may be made available for other tasks.

In a thirteenth operation, the main scheduler transmits a deallocation request to the auxiliary scheduler. In response to the deallocation request, in a fourteenth operation, the auxiliary scheduler transmits a "clean up" request to the N hosts that have been executing auxiliary service X, and auxiliary service X may be ended immediately, or may continue to run for a particular amount of time, based on a policy that relates to auxiliary service X. For example, the policy may indicate that the auxiliary service is to be 1) ended immediately; 2) continued for a specific amount of time; 3) continued until a subsequent auxiliary service request is received; or 4) continued until an express shutdown request is received.

In a fifteenth operation, the auxiliary scheduler updates the auxiliary service map to reflect the deallocation of the N hosts with respect to auxiliary service X. In a sixteenth operation, the auxiliary scheduler notifies the main scheduler that the deallocation is complete. In a seventeenth operation, the main schedule deallocates the corresponding grid computing resources and returns the resources to the resource pool.

Figure 6:
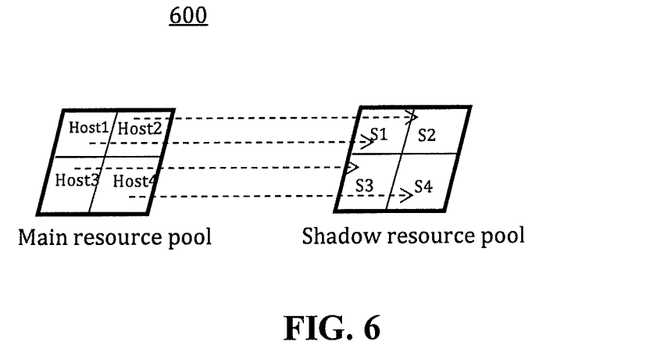
FIG. 6 is a diagram that illustrates a mapping between a main resource pool and a shadow resource pool that is utilized in a process for scheduling and managing auxiliary services in a grid computing environment, according to an exemplary embodiment.
Figure 7:
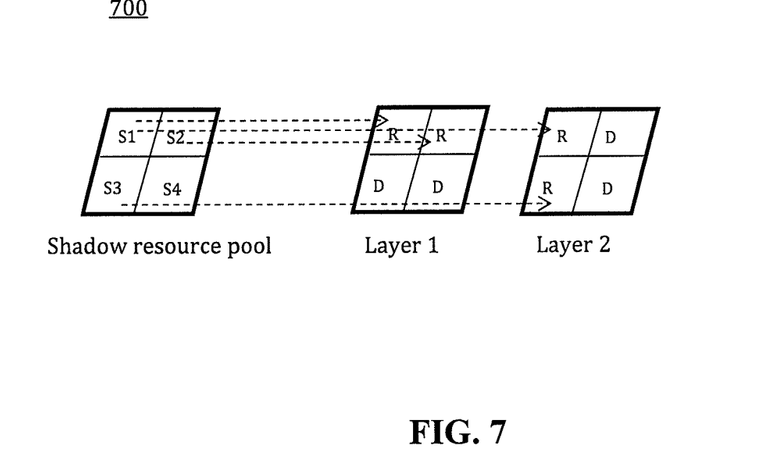
FIG. 7 is a diagram that illustrates a multi-layer map between a shadow resource pool and layers that correspond to auxiliary services, according to an exemplary embodiment.

FIG. 6 is a diagram that illustrates a mapping between a main resource pool and a shadow resource pool that is utilized in a process for scheduling and managing auxiliary services in a grid computing environment, according to an exemplary embodiment. FIG. 7 is a diagram that illustrates a multi-layer map between a shadow resource pool and layers that correspond to auxiliary services, according to an exemplary embodiment.

Referring to FIG. 6 and FIG. 7, the auxiliary service map repository 206(1) may include an auxiliary service map and a plurality of scheduling policies, although the repository 206(1) may include other policies, modules, databases, or applications, for example.

An auxiliary service map may include at least one main resource pool, at least one shadow resource pool, and at least one multi-layer map for auxiliary services. FIG. 6 shows an example of a mapping 600 between a main resource pool and a shadow resource pool, each of which is associated with one of a plurality of data analytics devices. In an exemplary embodiment, the main resource pool includes a group of host server devices which are eligible to run data analytics applications. The hosts may include a central processing unit (CPU), a graphics processing unit (GPU), or both. This main resource pool is shared with multiple data analytics devices. The scheduling for the main resource pool may be performed, for example, by middleware devices. For example, the middleware devices employed for performing the scheduling operations for the main resource pool may include any one or more of IBM Conductor For Spark or Apache Spark, although any number of other data analytics server devices may be included.

In an exemplary embodiment, the auxiliary service scheduling/management module 302 utilizes the main resource pool to create a shadow resource pool, as illustrated in FIG. 6. Further, a plurality of shadow resource pools may be created based on a plurality of main resource pools. The shadow resource pool mirrors the main resource pool to store exactly the same hosts as in the main resource pool. Depending on the overhead of the auxiliary service, the shadow resource pool may not contain any actual CPU power, if the overhead is trivial. Alternatively, the shadow resource pool may contain a small portion of CPU power, if the shadow pool runs CPU-intensive or memory-intensive auxiliary services.

In the example illustrated in FIG. 6, the main resource pool indicates that a main workload runs in each of Host1, Host2, Host3 and Host4, and corresponding auxiliary services run in S1, S2, S3 and S4. By way of example, Host1 is mapped to the shadow resource pool as S1; Host2 is mapped to the shadow resource pool as S2; Host3 is mapped to the shadow resource pool as S3; and Host4 is mapped to the shadow resource pool as S4.

Referring also to FIG. 7, in an exemplary embodiment, once the shadow resource pool is created, the auxiliary service scheduling/management module 302 creates a multi-layer map 700 between the shadow resource pool and its associated auxiliary services. The shadow resource pool is utilized to create a Layer 1, which is associated with a first auxiliary service, and a Layer 2, which is associated with a second auxiliary service. In this regard, each layer of the multi-layer mapping 700 represents an individual auxiliary service and further marks the status of the auxiliary service associated with the resource pool. By way of example, two primary statuses of "R: running" and "D: down" are shown in FIG. 7, although any number and type of status may be included. When an auxiliary service is initialized on a host, the auxiliary service scheduling/management module 302 may mark the corresponding portion of the map as "R"; and when the service is not in use, the corresponding portion of the map may be marked as "D", as illustrated in FIG. 7.

The auxiliary service map repository 206(1) may also store information that relates to policies for scheduling auxiliary services. In an exemplary embodiment, the policy storage may include a policy A, a policy B, a policy C and a policy D, although any number and/or types of policies can also be included. For example, policy A may correspond to a "shutdown immediately" policy: Based on policy A, upon completion of the main workload, the auxiliary service is to be shut down and cleaned up immediately thereafter. The auxiliary service will be restarted when the same type of workload is scheduled again.

Policy B may correspond to a "run until new different workload" policy: Based on policy B, upon completion of the main workload, the auxiliary service will continue to run. If the same type of workload is scheduled again, there is no need to restart the auxiliary service. Such a policy enables an avoidance of a transition that would otherwise be required to restart the auxiliary service, and also serves to speed up the main workload. When a different type of workload is scheduled on the host, the existing auxiliary service will be shut down and cleaned up immediately in the preparation for the new workload.

Policy C may correspond to a "delayed shutdown" policy: Based on policy C, upon completion of the main workload, the auxiliary service will continue to run for a predefined time interval (e.g., 10 minutes). During the predefined time interval, if the same type of workload is scheduled again, there is no need to restart the auxiliary service, thereby enabling an avoidance of a transition to restart up the auxiliary service and a speeding up of the main workload. If a different type of workload is scheduled on the host during the predefined time interval, or there is no new scheduling of the same type of workload during the predefined time interval, the auxiliary service will be shut down and cleaned up.

Policy D may correspond to a "shut down only per shutdown command" policy: Based on policy D, once an auxiliary service is initialized, it will remain in a running/operational status until an express command to shutdown is received. This policy is usually used for an auxiliary service that requires a relatively small amount of computational resources.

The communication interface of the auxiliary scheduler apparatus operatively couples and communicates between the auxiliary scheduler apparatus, the auxiliary service server device, data analytics devices, main scheduler server devices and/or the client devices, which are all coupled together by the communication network(s), although other types and/or numbers of communication networks or systems with other types and/or numbers of connections and/or configurations to other devices and/or elements can also be used.

In accordance with one or more exemplary embodiments, a process for managing computing resources provides several features, including: 1) enablement of dynamical resource sharing for data analytics applications with dependencies on data cache and shuffle services; 2) enablement of dynamical resource sharing for applications with dependencies on other services which may have different life cycles; and 3) separation of the main workload scheduler and auxiliary service scheduler to reduce complexity and improve feasibility for auxiliary service management. In this aspect, the shadow resource pool isolates the main workload scheduler and auxiliary service scheduler in different domains, and the multi-layer map is used to decouple the relationship between the main workload scheduler and the auxiliary service scheduler.

In an exemplary embodiment, a process for managing computing resources is applicable to many possible use cases. A first exemplary use case relates to shuffle services for an Apache Spark workload in a multi-tenant cluster. Many Apache Spark applications require a shuffle service to exchange data between tasks. The shuffle service must be started on a host before the tasks can be dispatched to the host. In this aspect, an auxiliary service scheduling system according to an exemplary embodiment may be used to dynamically manage the lifecycle of the shuffle services so that multiple Apache Spark applications are able to share resources in a compute grid.

A second exemplary use case relates to data cache services for data analytics applications. Data cache services are required by many applications, such as, for example, Ignite and Hazelcast. For purposes of optimizing system performance, the tasks for such applications are typically required to run on the same host as the data cache service. Thus, in accordance with an exemplary embodiment, an auxiliary service scheduling system may be used to dynamically manage the lifecycle of the data cache services so that these types of applications are able to share resources in a compute grid.

A third exemplary use case relates to tools that are used for troubleshooting to be run on the same server at which a main workload is running. In an exemplary embodiment, an auxiliary service scheduling system may be used to access such a troubleshooting tool as an auxiliary service on a server in order to probe a problem for a particular application.

A fourth exemplary use case relates to system hygiene, i.e., a cleanup tool as an auxiliary service to be managed by an auxiliary service scheduling system according to an exemplary embodiment. In this aspect, when a host server is allocated across lines of business (LOBs), a cleanup tool may be useful for avoiding impacts that may otherwise arise as a result of the various LOBs.

A fifth exemplary use case relates to workload-specific monitoring services. In an exemplary embodiment, an auxiliary service scheduling system may be used for such services.

Accordingly, with this technology, an optimized process for managing computing resources is provided. The optimized process enables a scheduling and management of auxiliary services for data analytics applications in a grid computing environment in a manner that increases system security and robustness.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing resources in a grid computing environment, the method being implemented by a processor on a computing device, the method comprising:
    receiving, from a first client device, a first request for an access to a first auxiliary service in support of a first task execution on the first client device;
    identifying at least one recommended server device that is currently running the first auxiliary service;
    generating a recommended server list that includes the at least one recommended server device;

using an auxiliary service map and the recommended server list to determine at least one server device that is available for providing the access to the first auxiliary service;
allocating, to the first client device, at least one of the available at least one server device;
initializing the first auxiliary service on the allocated at least one server device when the first auxiliary service is not running on the allocated at least one server device;
updating the auxiliary service map based on a result of the allocating;
executing, by the first client device, the first task using the first auxiliary service;
receiving, from the first client device, a notification that the first task has completed executing;
deallocating each of the allocated at least one server device; and
updating the auxiliary service map based on a result of the deallocating.

2. The method of claim 1, further comprising initializing the first auxiliary service on the allocated at least one server device prior to the updating the auxiliary service map, and wherein the initializing further comprises transmitting an initialization request to the allocated at least one server device.

3. The method of claim 1, further comprising:
receiving, from a second client device and prior to the deallocating, a second request for an access to a second auxiliary service in support of a second task execution on the second client device;
using, prior to the deallocating, the updated auxiliary service map to determine at least one server device that is available for providing the access to the second auxiliary service;
allocating, to the second client device, at least one of the available at least one server device; and
updating the auxiliary service map based on a result of the allocating to the second client device.

4. The method of claim 3, wherein the auxiliary service map includes a plurality of layers, wherein a number of layers corresponds to a number of auxiliary services, and each respective layer from among the plurality of layers includes a plurality of server devices from which an availability determination is to be made.

5. The method of claim 4, further comprising: when at least one additional request is received for access to at least one additional auxiliary service in support of at least one additional task execution, dynamically sharing the plurality of server devices by using the auxiliary service map to determine, for each of the plurality of server devices, a respective time slot of availability for providing access to the at least one additional auxiliary service.

6. The method of claim 4, wherein the availability determination is made by determining, for each of the plurality of server devices, at least one of an amount of available memory and an amount of available central processing unit (CPU) capacity.

7. The method of claim 1, wherein the first task comprises at least one of a data analytics application and a high performance computing (HPC) application.

8. The method of claim 1, further comprising:
when the notification that the first task has completed execution is received, delaying a deallocation of each of the allocated at least one server device until a second request for an access to a second auxiliary service is received;
receiving, from a second client device, the second request for the access to the second auxiliary service in support of a second task execution on the second client device; and
performing the deallocating in response to the receiving the second request.

9. A computing device configured to implement an execution of a method for managing resources in a grid computing environment, the computing device comprising:
a processor;
a memory; and
a communication interface coupled to each of the processor and the memory, wherein the processor is configured to:
receive, from a first client device, a first request for an access to a first auxiliary service in support of a first task execution on the first client device;
identify at least one recommended server device that is currently running the first auxiliary service;
generate a recommended server list that includes the at least one recommended server device;
use an auxiliary service map and the recommended server list to determine at least one server device that is available for providing the access to the first auxiliary service;
allocate, to the first client device, at least one of the available at least one server device;
initialize the first auxiliary service on the allocated at least one server device when the first auxiliary service is not running on the allocated at least one server device;
update the auxiliary service map based on a result of the allocating;
execute, by the first client device, the first task using the initialized first auxiliary service;
receive, from the first client device, a notification that the first task has completed executing;
deallocate each of the allocated at least one server device; and
updating the auxiliary service map based on a result of the deallocating.

10. The computing device of claim 9, wherein the processor is further configured to initialize the first auxiliary service on the allocated at least one server device prior to the updating the auxiliary service map, and wherein the initializing further comprises transmitting an initialization request to the allocated at least one server device.

11. The computing device of claim 9, wherein the processor is further configured to:
receive, from a second client device and prior to the deallocating, a second request for an access to a second auxiliary service in support of a second task execution on the second client device;
use, prior to the deallocating, the updated auxiliary service map to determine at least one server device that is available for providing the access to the second auxiliary service;
allocate, to the second client device, at least one of the available at least one server device; and
update the auxiliary service map based on a result of the allocating to the second client device.

12. The computing device of claim 11, wherein the auxiliary service map includes a plurality of layers, wherein a number of layers corresponds to a number of auxiliary services, and each respective layer from among the plurality of layers includes a plurality of server devices from which an availability determination is to be made.

13. The computing device of claim 12, wherein the processor is further configured to: when at least one additional request is received for access to at least one additional auxiliary service in support of at least one additional task execution, dynamically share the plurality of server devices by using the auxiliary service map to determine, for each of the plurality of server devices, a respective time slot of availability for providing access to the at least one additional auxiliary service.

14. The computing device of claim 12, wherein the availability determination is made by determining, for each of the plurality of server devices, at least one of an amount of available memory and an amount of available central processing unit (CPU) capacity.

15. The computing device of claim 9, wherein the first task comprises at least one of a data analytics application and a high performance computing (HPC) application.

16. The computing device of claim 9, wherein the processor is further configured to:
when the notification that the first task has completed execution is received, delay a deallocation of each of the allocated at least one server device until a second request for an access to a second auxiliary service is received;
receive, from a second client device, the second request for the access to the second auxiliary service in support of a second task execution on the second client device; and
perform the deallocation in response to the receiving the second request.

17. A non-transitory computer-readable medium storing instructions which, when executed by a processor, cause the processor to execute a method for managing resources in a grid computing environment, the method comprising:
receiving, from a first client device, a first request for an access to a first auxiliary service in support of a first task execution on the first client device;
identifying at least one recommended server device that is currently running the first auxiliary service;
generating a recommended server list that includes the at least one recommended server device;
using an auxiliary service map and the recommended server list to determine at least one server device that is available for providing the access to the first auxiliary service;
allocating, to the first client device, at least one of the available at least one server device;
initializing the first auxiliary service on the allocated at least one server device when the first auxiliary service is not running on the allocated at least one server device;
updating the auxiliary service map based on a result of the allocating;
executing, by the first client device, the first task using the first auxiliary service;
receiving, from the first client device, a notification that the first task has completed executing;
deallocating each of the allocated at least one server device; and
updating the auxiliary service map based on a result of the deallocating.

18. The computer-readable medium of claim 17, wherein the method further comprises initializing the first auxiliary service on the allocated at least one server device prior to the updating the auxiliary service map, and wherein the initializing further comprises transmitting an initialization request to the allocated at least one server device.

* * * * *